US011363104B2

(12) United States Patent
Sethi

(10) Patent No.: US 11,363,104 B2
(45) Date of Patent: Jun. 14, 2022

(54) SUBSCRIPTION BASED DIRECTORY SERVICES FOR IOT DEVICES

(71) Applicant: Hewlett Packard Enterprise Development LP, Houston, TX (US)

(72) Inventor: Aseem Sethi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 527 days.

(21) Appl. No.: 16/223,801

(22) Filed: Dec. 18, 2018

(65) Prior Publication Data

US 2020/0195733 A1 Jun. 18, 2020

(51) Int. Cl.
| | |
|---|---|
| *H04L 67/51* | (2022.01) |
| *H04L 67/55* | (2022.01) |
| *H04L 67/01* | (2022.01) |
| *H04W 4/70* | (2018.01) |
| *H04L 67/12* | (2022.01) |
| *H04W 84/18* | (2009.01) |

(52) U.S. Cl.
CPC .............. *H04L 67/16* (2013.01); *H04L 67/12* (2013.01); *H04L 67/26* (2013.01); *H04L 67/42* (2013.01); *H04W 4/70* (2018.02); *H04W 84/18* (2013.01)

(58) Field of Classification Search
CPC ......... H04L 67/12; H04L 67/16; H04L 67/26; H04L 67/42; H04W 4/029; H04W 4/70; H04W 84/18
See application file for complete search history.

(56) References Cited

U.S. PATENT DOCUMENTS

| | | | | |
|---|---|---|---|---|
| 8,856,289 B2 * | 10/2014 | Ansari | ................ | H04L 61/1576 |
| | | | | 709/220 |
| 9,762,556 B2 * | 9/2017 | James | ................... | H04W 12/04 |
| 9,853,826 B2 * | 12/2017 | Shuman | ................. | H04L 67/12 |
| 10,083,055 B2 * | 9/2018 | Gupta | ................ | H04L 61/6022 |
| 10,999,380 B2 * | 5/2021 | Flynn, IV | ............... | H04L 67/16 |
| 2015/0134954 A1 * | 5/2015 | Walley | ................ | H04L 63/0823 |
| | | | | 713/168 |

(Continued)

FOREIGN PATENT DOCUMENTS

WO WO-2018106985 6/2018

OTHER PUBLICATIONS

Internet of Things: Architectures, Protocols, and Applications, (Research Paper), 2017, 41 Pgs.

(Continued)

*Primary Examiner* — Thomas J Dailey
(74) *Attorney, Agent, or Firm* — Brooks, Cameron & Huebsch, PLLC

(57) ABSTRACT

An example system comprising a management server to execute a directory service for internet-of-things (IoT) devices deployed on the management server, the management server to receive a subscription message including a topic about the IoT devices from a client device, store an address of the client device and the corresponding topic subscribed by the client device in the directory service for the IoT devices, extract device information from a sensor, wherein the device information includes the topic about the IoT devices, and transmit a configuration packet to the sensor in response to an identification of the topic from the device information, wherein the configuration packet includes the address of the client device.

19 Claims, 5 Drawing Sheets

(56) References Cited

U.S. PATENT DOCUMENTS

| | | | |
|---|---|---|---|
| 2015/0264134 A1 | 9/2015 | Dong et al. | |
| 2016/0119740 A1 | 4/2016 | Tsiatsis et al. | |
| 2017/0046366 A1 | 2/2017 | Rahman et al. | |
| 2017/0310767 A1 | 10/2017 | Flynn et al. | |
| 2018/0191814 A1* | 7/2018 | Kinarti | H04L 67/1034 |
| 2018/0213378 A1* | 7/2018 | Brown | H04L 67/12 |
| 2018/0288159 A1* | 10/2018 | Moustafa | H04L 67/125 |

OTHER PUBLICATIONS

Kafle, V.P. et al., Design of Scalable Directory Service for Future Iot Applications, (Research Paper), Nov. 14-16, 2016, 4 Pgs.

Kafle, V.P. et al., Design of Scalable Directory Service for Future Iot Applications, (Research Paper), Nov. 14-16, 2016, 8 Pgs.

Qasem, M. et al., A Dynamic Power Tuning for the Constrained Application Protocol of Internet of Things, (Research Paper), 2015, 5 Pgs.

D'Ambrosio et al., "MDHT: A Hierarchical Name Resolution Service for Information-Centric Networks", Proceedings of the ACM SIGCOMM workshop on Information-centric networking, Aug. 19, 2011, pp. 7-12.

ITU-T Rec. X.500, "Information Technology—Open Systems Interconnection—The Directory: Overview of Concepts, Models and Services", Oct. 2012, 32 pages.

Kafle et al., "Scalable Directory Service for IoT Applications", Sep. 2017, 7 pages.

Oasis, "MQTT 3.1.1 specification", Dec. 10, 2015, 81 pages.

Ramasubramanian et al.,"The Design and Implementation of a Next Generation Name Service for the Internet", Proceedings of the 2004 conference on Applications, technologies, architectures, and protocols for computer communications, 12 pages.

Sharma et al., "A Global Name Service for a Highly Mobile Internetwork", Proceedings of the 2014 ACM conference on SIGCOMM, 12 pages.

Shelby et al., "CoRE Resource Directory", Internet-Draft (work in progress), Mar. 13, 2017, 52 pages.

* cited by examiner

SUBSCRIPTION BASED DIRECTORY SERVICES FOR IOT DEVICES

BACKGROUND

Computing devices may include a directory service. Directory services may identify resources on a network, and devices on the network. Directory services may include a shared infrastructure for locating, managing, and organizing network resources. The directory service may indicate the names and locations of resources and devices.

DETAILED DESCRIPTION

Figure 1:
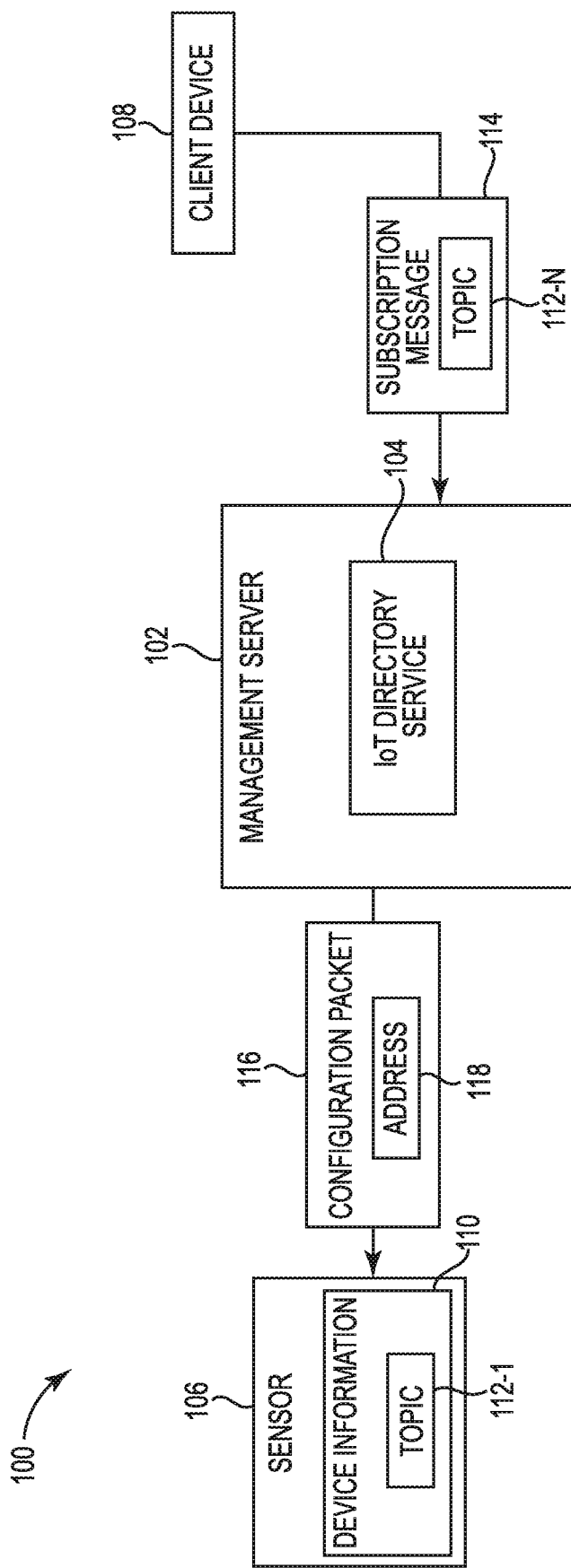
FIG. 1 illustrates an example system including a management server for subscription based directory services for IoT devices consistent with the disclosure.

Computing devices such as servers, controllers, etc. may include a directory service to map the operation of multiple devices in communication with the computing device. For example, a server may manage the operations of multiple devices within a network of devices. The devices within the network may transmit and receive packets of information. The server may include a directory service to provide information to the devices about where their respective packets may be transmitted. For example, a directory service may map a name of a first device and/or a resource of the first device and the location of a second device which may receive a packet from the first device.

Computing devices such as servers may manage an environment including multiple devices which may transmit and receive packets of information within the environment. As used herein, a "device" refers to an article that is adapted for a particular purpose and/or multiple purposes. Some examples, of devices are sensors, personal computers, laptops, tablets, phablets, smartphones, Internet-of-Things (IoT) enabled devices, etc., which may be included on a virtualized architecture and/or a non-virtualized architecture. As used herein, "IoT enabled devices" include devices embedded with electronics, software, sensors, actuators, and/or network connectivity which enable such devices to connect to a network and/or exchange data. Examples of IoT enabled devices include sensors, vehicles, home appliances, smart home devices, monitoring devices, wearable devices, devices enabling intelligent shopping systems, manufacturing devices, among other cyber-physical systems. A management server may manage the operation of multiple devices in an environment which may be rural and or rely on information from IoT enabled sensors.

As used herein, the term "management server" refers to a computing device which monitors, and/or otherwise manages the operation of a computing environment. For example, a management server may manage the operation of multiple devices via a wired connection or a wireless connection between the management server and the devices within a network. In some examples, multiple IoT devices such as sensors may be deployed in a rural environment to take measurements of the environment and provide data about the measurements to a client device interested in the data provided by the sensor. As used herein, the term "rural" refers to an environment which comprises reduced resources. In some examples, a rural environment may include an area including a sparse population of humans, minimal computing resources, minimal power resources, low economic development, minimal computing infrastructure, few skilled technical users, etc. as compared to an area that is not rural where connectivity may be abundant, skilled populations of humans, and/or an increased population of sophisticated users may be present. In such rural environments, multiple sensors may be IoT sensors utilized to provide data about the rural environment to client devices. The sensors may be designed to periodically take a measurement of data and transmit that data to another device. In such environments, it may be difficult to repair, service, replace, and/or provide power for multiple devices such that the devices may continually transmit their data to respective client devices.

As used herein, the term "client device" refers to a device in communication with a management server where the client device may receive and/or transmit data. For example, the client device may be a temperature server to receive temperature data from a sensor. Rural environments may include multiple IoT devices acting as sensors for multiple purposes. For example, the sensors may measure temperature, water-level, daylight, soil moisture, rainfall, etc. and report these measurements to a management server in the rural environment and/or to a client device (e.g., a smartphone application). The client devices interested in receiving the information from the sensors may change frequently, likewise, sensors may be replaced and/or added to the environment frequently. As such, the sensors may demand frequent reconfiguration, maintenance, and/or adjustment to maintain connectivity to the appropriate client device. Frequent reconfiguration, maintenance, and/or adjustment may be a burdensome task, cause error, and/or waste resources such as energy, time, and money. Further, frequent reconfiguration, maintenance, and/or adjustment of the sensors may cause the sensors to use more energy (e.g., batteries) thus demanding frequent servicing and/or replacement.

Some solutions may utilize a Domain Name System (DNS) to resolve queries from IoT devices (e.g., sensors) determining where (e.g., the client device) to transmit the data collected by the sensor. While these solutions resolve queries from the IoT devices, DNS demands memory resources and processing which may drain a battery of the sensor and accelerate the frequent replacement and maintenance to the IoT devices. As mentioned, in rural environments with multiple IoT devices such as sensors, frequent battery servicing, maintenance, replacement, etc. may be difficult and impractical. Further, rural environments may have dynamically changing demands regarding the quantity of IoT devices added to the environment at a given period. Thus, solutions utilizing DNS may include technical challenges that are not suited for dynamically changing rural environments utilizing multiple IoT devices.

In addressing these technical challenges, some examples as disclosed herein may utilize a directory service for IoT devices deployed on a management server using a publish-subscribe based messaging protocol (e.g., Message Queuing Telemetry Transport (MQTT)) which may be supported by low-cost IoT devices. As used herein, the term "low-cost IoT device" refers to a device which may include basic operations. As used herein, the term "basic" refers to a device with limited functionality. For example, a basic, low-cost IoT device may be a sensor operable to take measurements and transmit its data. A basic low-cost IoT device may have limited system on chip, and/or limited computing capabilities. In some examples, multiple low-cost IoT devices may be utilized and be deposable (e.g., designed to operate for limited periods of time). For example, a low cost IoT device may be a sensor operating as an IoT device with limited computing capabilities. As used herein, a "high cost IoT device" refers to a device with complex operations. For example, a high cost IoT device may be an autonomous vehicle with IoT capabilities and sophisticated computing capabilities. Low-cost IoT devices may be suitable for their simplicity for use in rural environments such as farms. Many low cost IoT devices have the capability to participate in publish-subscribe based directory services to deliver data obtained by the IoT device.

For example, a rural environment (e.g., a farm), may utilize multiple low cost IoT devices acting as sensors for multiple purposes (e.g., temperature, water-level, humidity, soil moisture, rainfall, sunlight, etc.). The multiple sensors may provide data to another device during predetermined intervals (e.g., hourly, daily, etc.). The multiple sensors may be able to connect to client devices (e.g., temperature servers, humidity servers, etc.) via a directory service for IoT devices deployed on a management server. For example, as described herein, a management server may execute a directory service for IoT devices deployed on the management server. The management server may monitor and manage a network including multiple client devices and multiple IoT devices (e.g., sensors). The management server may receive subscription messages from the client devices including a topic, where the topic describes a function of a sensor, and the management server may store the address of the client devices and their corresponding topics in the directory service for IoT devices. As a sensor is activated in the network, the management server may extract device information from the sensor where the device information includes a topic. The management server may match the topic from the sensor to a topic stored in the directory service for IoT devices and transmit a configuration packet including the address of the client device whose topic is the same as the sensor. In this way, the sensor may be operable to transmit the data about the topic to the client device collecting information about the topic.

Subscription based directory services for IoT devices as described herein provide a dynamic solution to facilitating data delivery to client devices from multiple low cost IoT devices operating as sensors. A publish-subscribe protocol such as MQTT may enable IoT devices operating as sensors to connect to a directory service for IoT devices accessible to client devices, without the demand to hardwire each IoT device to a specific client device. In this way, the IoT device may preserve resources (e.g., battery) and demand less maintenance and replacement.

FIG. 1 illustrates an example system 100 including a management server 102 for subscription based directory services for IoT devices consistent with the disclosure. FIG. 1 illustrates a system 100 including a management server 102, deployed with an IoT directory service 104. The management server 102 may monitor a network including a sensor 106 (and/or a plurality of sensors 106) and a client device 108 (and/or a plurality of client devices 108). The client device 108 may transmit a subscription message 114 to the management server 102. The sensor 106 may include device information 110 including a topic 112-1 where the topic 112-1 is a description of the operation of the sensor 106. The sensor 106 may receive a configuration packet 116 including the address 118 of the client device 108. In some examples, the management server 102 manages multiple devices in a network.

As used herein, the term "manage" refers to the oversight of a network (e.g., an environment). For example, the management server 102 may recognize when a device (e.g., an IoT device) has been added to or removed from operation in a network. Said differently, the management server 102 may manage a network including a sensor 106. In some examples, the management server 102 may monitor which devices are in the network and which devices have been removed from the network. In some examples, the management server 102 may include a controller including a memory resource and a processing resource to execute the IoT directory service 104 which may be accessible to a client device 108 (and/or a plurality of client devices 108).

Although not illustrated in FIG. 1, as to not obscure the examples of the disclosure, the management server 102 may include a processing resource. For example, the processing resource may be central processing units (CPUs), semiconductor-based microprocessors, and/or other hardware devices suitable for retrieval and execution of instructions stored in a memory resource (e.g., in a non-transitory computer readable medium). The example processing resource may fetch, decode, and execute instructions. As an alternative, or in addition to, retrieving and executing instructions, the example processing resource may include an electronic circuit that may include electronic components for performing the functionality of executed instructions.

In some examples, the processing resource may be a plurality of hardware processing units that may cause machine-readable instructions to be executed. The processing resource may include central processing units (CPUs) among other types of processing units. The memory resource may be any type of volatile or non-volatile memory or storage, such as random-access memory (RAM), flash memory, storage volumes, a hard disk, or a combination thereof. The management server 102 may execute an IoT directory service 104 deployed on the management server 102.

For example, the IoT directory service 102 may be accessible to devices (e.g., IoT devices and/or client devices) and may be dynamically accessible to client devices based on keywords (e.g., topics). As used herein, the term "topic" refers to a keyword that may describe a function of an IoT device. For example, a topic may be a term describing the function of the sensor 106. Some examples of sensor functions may be to detect data about temperature, humidity, precipitation, ultraviolet radiation, sunlight, atmospheric content concentration, sound, pressure, movement, or combinations thereof. In some examples, the topic may be encoded as an UTF-8 string. The management server 102 may store multiple topics in the IoT directory service 104 corresponding to a client device 108 that has requested to obtain data about the topic. For example, the management server 102 may receive a subscription message 114 including a topic 112-N about the IoT devices from a client device 108. The topic 112-N included in the subscription message 114 refers to the data about IoT devices in an IoT environment that the client device 108 is interested in receiving information about and may be the same keyword describing a function of an IoT device (e.g., the topic 112-1). As used herein, the term "subscription message" refers to a text string indicating information about the client device 108, and the type of information that the client device 108 is interested in receiving information about. For example, the client device 108 may be a temperature server and the subscription message 114 may include information about the temperature server (e.g., location, address, type, etc.) and the topic 112-N which in this instance is "temperature". The management server 102 may store the subscription message 114 in the IoT directory service 104 such that it is reachable by the devices managed by the management server 102 in the network.

For example, the management server 102 may store an address 118 of the client device 108 and the corresponding topic 112-N of the client device 108 in the IoT directory service 104. In other words, the management server 102 may store the address 118 of the client device 108 and the corresponding topic 112-N from the client device 108 by creating an entry in a look up table stored in the IoT directory service 104. In some examples, the management server 102 may store a look up table in the IoT directory service 104. For example, the look up table may be indexed by topic (e.g., topic 112-N) such that the management server 102 may cross reference a received topic 112-N in the look up table to obtain the address 118 of a client device 108 which subscribed to receive information about the topic 112-N. Below is an example of a look up table stored on the IoT directory service 104 for IoT devices.

TABLE 1

| Topic Index | Message string | Client Device | Address | Lifetime |
| --- | --- | --- | --- | --- |
| Temperature | subscribe/temperature/server | Temperature Server | ABCD | 100 minutes |
| Humidity | subscribe/humidity/server | Humidity Server | EFGH | 200 minutes |
| Rainfall | subscribe/rainfall/server | Rainfall Server | IJKL | 300 minutes |

While the example topics listed in the topic index of table 1 are temperature, humidity, and rainfall, multiple topics are contemplated in the present disclosure. Such topics may represent any attributes of the IoT environments that are commonly monitored by the IoT devices. Likewise, the address listed for each client device are examples of text of an example address for each client device. For each of the topics indexed, the following information is stored in one of the rows in the table: the message string received from each subscription message 114, the client device 108 corresponding to the topic 112-N, the subscription message 114, and a lifetime value indicating an amount of time that the client device is valid (and may receive information about the topic 112-N). As used herein, the term "valid" refers to a device managed by the management server 102 being with the predetermined lifetime assigned by the management server 102. For example, a client device 108 may be validated by the management server 102 when the client device 108 is receiving data from a sensor 106 within the predetermined period of time assigned as its lifetime. The look up table may exist such that it may be referenced dynamically as devices (e.g., sensor 106) are added and removed from the network managed by the management server 102. When new devices are added to the network, addresses in the look up table may be assigned to the new devices, the addresses may be updated within the look up table based on the lifetimes assigned to the client devices (e.g., the client device 108) corresponding to the addresses.

For example, the lifetime column refers to a period of time when a client device (e.g., the client device 108) is permitted to receive data about the topic. As used herein, the term "lifetime" may be a predetermined period of time, during which the client device is valid. The lifetime may be a 16-bit unsigned integer which may be counted in units of one minute. The validity of the address (e.g., the lifetime) assigned to a client device may begin when the management server 202 assigns the address to an IoT device (e.g., the sensor). For example, a client device 108 may be assigned a lifetime during which the client device 108 is available (e.g., valid) to receive data from an IoT device, and the lifetime may begin when the address of the client device is assigned to the sensor 106. In some examples, the IoT directory service 104 may disable the client device 108 when the lifetime has expired. As used herein, the term "expire" refers to an instance when the lifetime of the client device has ended. For example, the IoT directory service 104 may disable the subscription message (e.g., subscription message 114) of the corresponding client device (e.g., client device 108) after the predetermined period of time. In some examples, the IoT directory service 104 may disable the subscription message by removing the address of the corresponding client device from the look up table. The client device 108 may re-subscribe to the IoT directory service 104 in response to the expiration of the lifetime. In this way, the IoT directory service 104 may maintain an updated look up table to provide valid addresses to the sensor 106.

For example, a device such as the sensor 106 may be added to the network. When the sensor is switched to an operable position (e.g., installed and/or turned on), the management server 102 may extract the device information 110 from the sensor 106, where the device information 110 includes the topic 112-1. In other words, when the sensor is 106 is switched on, it may publish a message including device information 110 which may be extracted by the management server 102. In this instance, the sensor 106 is an IoT device and the topic 112-1 is a description of the operation of the IoT device. In some examples, the device information 110 may include a geographic location of the sensor 106. As mentioned herein, the topic refers to a keyword, as such the topic 112-1 and the topic 112-N may be a keyword, where the topic 112-1 describes an operation of the sensor 106 and the topic 112-N may be the same keyword describing the type of information that the client device 108 wants to receive information about. Specifically, the sensor 106 may be a temperature sensor and the topic 112-1 may be "temperature", the client device 108 may be interested in temperature data, thus the subscription message 114 may include the topic 112-N "temperature". The management server 102 may extract the device information 110 to provide the sensor 106 with a configuration packet 116.

For example, the management server 102 may transmit a configuration packet 116 to the sensor 106 in response to an identification of the topic 112-1 from the device information 110, where the configuration packet 116 includes the address 118 of the client device 108. In other words, the management server 102 may utilize a look up table (e.g., the table 1) deployed on the IoT directory service 104 and compare the topic 112-1 from the device information 110 to the topic index in the look up table. The management server 102 may match the topic 112-1 to the topic index of the look up table and generate a configuration packet 116 including the address 118 of the client device 108 corresponding to the topic index.

For example, the configuration packet 116 may alter the sensor 106 to transmit subsequent data about the topic to the client device 108 via the address 118 provided in the configuration packet 116. Specifically, the sensor may include the device information 110 with a topic 112-1 of "temperature". The management server 102 may compare the topic 112-1 "temperature" to the topic index of a look up table (e.g., table 1) and determine that the client device 108 is a temperature server and has transmitted a subscription message 114 with a topic 112-N of "temperature", where the topic 112-N relates to a measurement obtained from the sensor 106. In this instance, the management server 102 may generate a configuration packet 116 including the address 118 (e.g., ABCD) of the client device 108. In this way, the sensor 106 may refrain from having to be hardwired with a specific client device address. When the sensor 106 generates a temperature measurement, it may automatically transmit that packet of temperature data to the client device 108 because it has received the configuration packet 116 from the IoT directory service 104 via the management server 102. The management server 102 may dynamically direct devices such as low-cost IoT devices using the IoT directory service 104 and a publish-subscribe service.

Subscription based directory services for IoT devices described herein include a management server 102 which may implement a publish-subscribe messaging protocol (e.g., a MQTT protocol) using an IoT directory service 104. In this way, the management server 102 may dynamically alter where low-cost IoT devices transmit data without utilizing resources such as power, and time, to hardwire each device within a network managed by the management server 102. This may save resources (e.g., battery power) in IoT devices thus demanding less maintenance and/or replacement, which may be useful in rural environments where measurements taken by IoT devices such as the sensor 106 are demanded but resources may be sparse. A dynamic IoT directory service 104 accessible to client devices (e.g., the client device 108) may allow the client device 108 within the environment to subscribe and receive data from the sensor 106 having the topic 112-1 to which the client device 108 has subscribed. This way, the sensor 106, may transmit the data obtained from the management server 102 to the appropriate client device 108.

Figure 2:
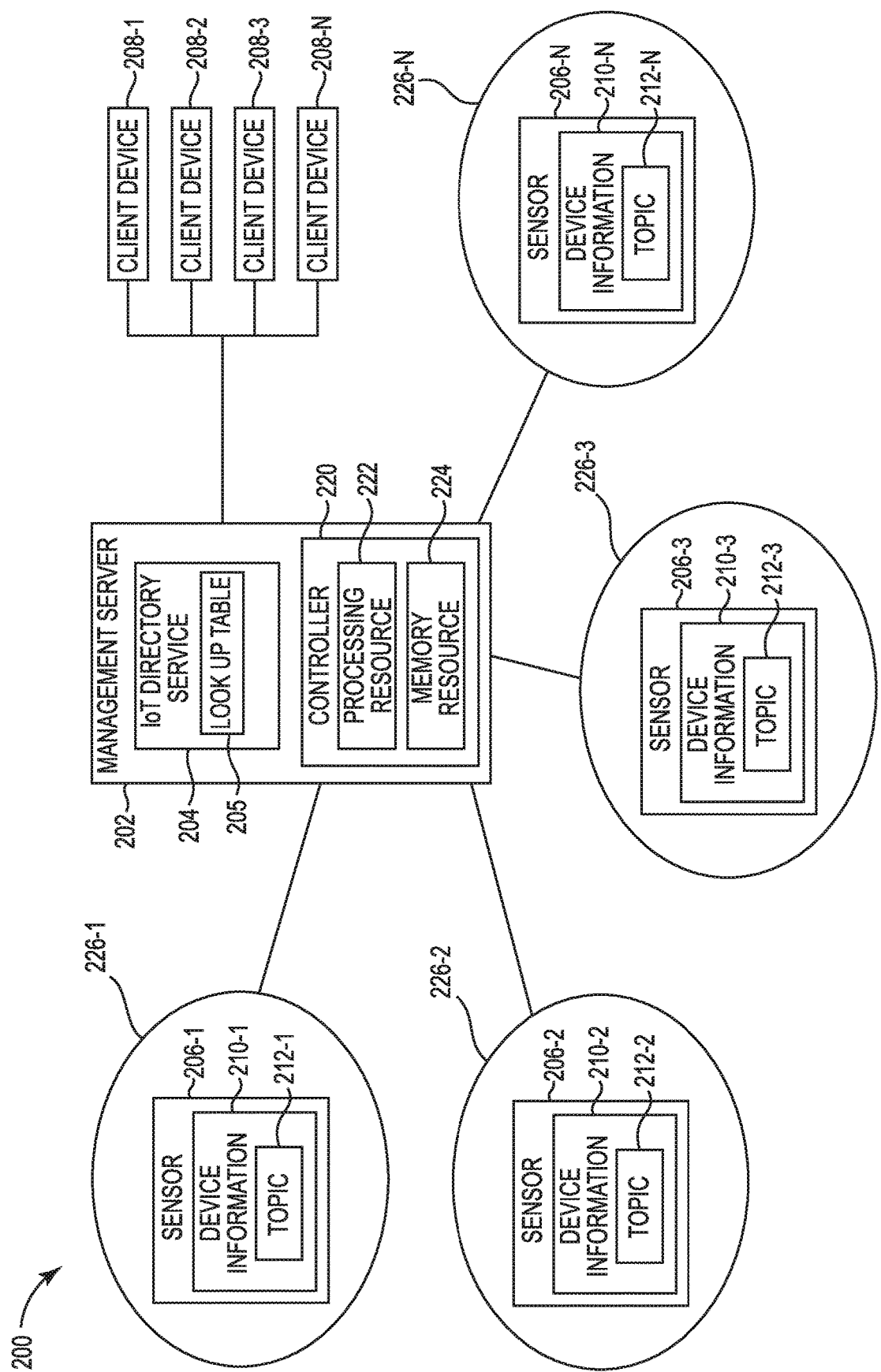
FIG. 2 illustrates an example system including a management server for subscription based directory services for IoT devices consistent with the disclosure.

FIG. 2 illustrates an example system 200 including a management server 202 for subscription based directory services for IoT devices consistent with the disclosure. FIG. 2 illustrates a management server 202 including an IoT directory service 204, a look up table 205 (e.g., table 1), a controller 220, a processing resource 222, and a memory resource 224. The management server 202 may monitor a plurality of IoT devices operating as sensors 206-1, 206-2, 206-3, and 206-N, which may be collectively referred to herein the plurality of sensors 206 and/or the sensors 206. The sensors 206 may include corresponding device information 210-1, 210-2, 210-3, and 210-N which may be collectively referred to herein the plurality of device information 210 or device information 110. Further, each of the plurality of device information may include a corresponding topic 212-1, 212-2, 212-3 and 212-N which may be collectively referred to herein the plurality of topics 212 and/or the topics 212. The sensors 206 may be in a particular location denoted as 226-1, 226-2, 226-3, and 226-N which may be collectively referred to herein the plurality of locations 226 and/or the locations 226. The locations 226 may be geographic locations within the network managed by the management server 202. The management server 202 may manage a plurality of client devices 208-1, 208-2, 208-3, and 208-N which may be collectively referred to herein the plurality of client devices 208 and/or the client devices 208. As illustrated in FIG. 2, the management server 202 may include the controller 220 including a memory resource 224 and a processing resource 222 to execute an IoT directory service 204 accessible to a plurality of client devices 208.

Although not illustrated in FIG. 2 as to not obscure examples of the disclosure, the plurality of client devices 208 may each include a topic (e.g., the topic 112-N) that the plurality of client devices 208 may be interested in receiving information about. Likewise, although not illustrated in FIG. 2 the plurality of client devices 208 may transmit a subscription message (e.g., the subscription message 114) including the topic that the client devices 208 are to receive information about. For example, the management server 202 may include a look up table 205 (e.g., table 1) including a plurality of topics about the IoT devices (e.g., the sensors 206) corresponding to the plurality of client devices 208. For example, the management server 202 (via the processing resource 222) may receive a subscription message (e.g., the subscription message 114) corresponding to a topic about the IoT devices from a client device of the plurality of client devices 208. In some examples, the client devices 208 may each correspond to a different topic, the same topic, and/or a combination of topics.

For example, the client device 208-1 may be a temperature server and include the topic "temperature" in its subscription message, the client device 208-2 may be a humidity server and include the topic "humidity" in its subscription message, the client device 208-3 may be a rainfall server and include the topic "rainfall" in its subscription message, and the client device 208-N may be a sunlight server and include the topic "sunlight" in its subscription message. The management server 202 may generate an entry in the look up table 205, the entry including information about the topic (e.g., temperature, humidity, rainfall, and sunlight as indexes in the look up table 205) and the address of the client device that corresponds to each topic. In this way, the management server 202 may dynamically map devices (e.g., the sensors 206 and/or other low-cost IoT devices) using the look up table 205 to the client devices 208 corresponding to the operation of the sensors 206.

In some examples, there may be multiple sensors 206 with the same topic 212. For example, the in a network managed by the management server 202, there may be multiple temperature sensors having the topic 212 "temperature", and the sensors may be in the same geographic location or different geographic locations. in this instance, the management server 202 may transmit the same address for a client device of the plurality of client devices 208 when the device information 210 is extracted.

For example, the management server 202 may extract device information 210 from a sensor of the plurality of sensors 206, where the device information 210 includes the topics 212 and a geographic location of the plurality of locations 226 of the sensors 206. Said differently, the sensors 206 may publish a message when they are added to the network (e.g., when they are installed and/or switched on), where the published message includes the device information 210 where the device information includes a geographic location, and the topic is an indicator of what the sensor is designed to generate. Because the management server 202 manages a network including a plurality of locations 226, the sensors 206 may be matched dynamically as they are added and removed from various locations 226. For example, the management server 202 may determine that the sensors 206-1 from a first geographic location 226-1, and sensor 206-3 from a third geographic location 226-3 have been installed into the network and may determine that the sensor 206-2 from the second geographic location 226-2 has been removed or otherwise disabled from the network. Thus, the management server 202 may dynamically update the IoT directory service 204 when the sensors 206 are added/removed. The management server 202 may utilize the IoT directory service 204 to match the sensors 206 to the client devices 208 as they are added and removed from the network.

For example, the management server 202 may utilize the look up table 205 to match the sensors 206 to the corresponding client devices 208. In other words, the management server 202 may determine, from the look up table 205, an address of the client device (of the plurality of client devices 208) corresponding to the topic from the device information 210 extracted from the sensor (e.g., of the plurality of sensors 206). Specifically, if the management server 202 has generated an entry in the look up table 205 that the client device 208-1 is subscribed to the topic "temperature", and the sensor 206-1 may include device information 210-1 and the topic 212-1 "temperature" the management server 202 may determine that the address of the client device 208-1 may receive the data from sensor 206-1 when it is collected by the sensor 206-1. The management server 202 may alter the sensor 206-1 such that subsequent data collected by the sensor 206-1 is transmitted to the client device 208-1.

Although not illustrated in FIG. 2 as to not obscure examples of the disclosure, the management server 202 may transmit a configuration packet (e.g., the configuration packet 116) to each of the plurality of sensors 206. For example, the management server 202 may transmit a configuration packet including the address of the client device 208-1 to which the sensor 206-1 may transmit data about the topic 212-1. Said differently, the sensor 206-1 is a temperature sensor, and the configuration packet alters the temperature sensor 206-1 to transmit temperature data to the address (the address of the client device 208-1) included in the configuration packet at predetermined intervals for a predetermined period of time. The predetermined period of time may be the lifetime of the client device 208-2 included in table 1.

For example, the predetermined period of time may correspond to a period of time of which the client device 208-1 is validated to receive data about the topic 212-1 from the sensor 206-1. The management server 202 may predetermine the lifetime of each client device of the plurality of client devices 208 when an entry is created in the look up table 205, where the predetermined period of time is the period of time for which the client device is valid. When the lifetime expires, the client devices 208 may transmit a new subscription message to re-subscribe to the topic to continue to receive information about the topic. In this way, the look up table 205 may be updated as the client devices 208 lifetimes expire. This may reduce an amount of error and/or redundancies causes by packets being transmitted from sensors 206 to client devices 208 which may be inoperable, removed from the network, and/or otherwise altered. This is discussed in further detail in connection with FIG. 3.

Subscription based directory services for IoT devices described herein include a management server 202 which may implement a publish-subscribe messaging protocol (e.g., a MQTT protocol) using an IoT directory service 204. The management server 202 may manage a plurality of IoT devices operating as sensors 206. The sensors may be in multiple different geographic locations 226 and may be added and subtracted from the network dynamically. The management server 202 may dynamically alter low-cost IoT devices utilizing a look up table 205 without depleting resources such as power, and time to hardwire each device within an environment managed by the management server 202. This may save resources (e.g., battery power) in IoT devices thus demanding less maintenance and/or replacement, which may be useful in rural environments where measurements taken by IoT devices such as the sensors 206 are frequently utilized but resources may be sparse and the sensors 206 may be in multiple different locations 226.

Figure 3:
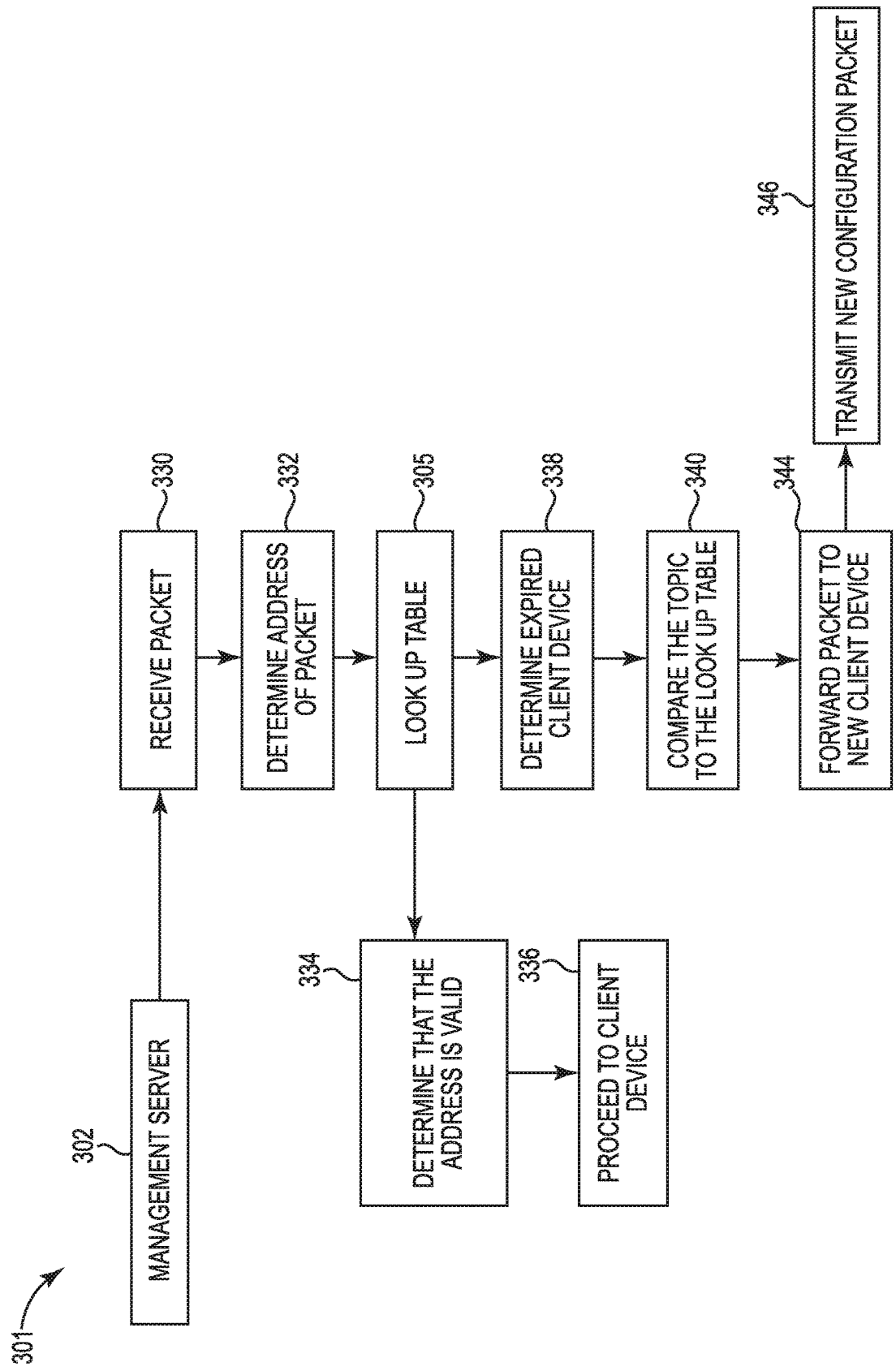
FIG. 3 illustrates an example flow chart for subscription based directory services for IoT devices consistent with the disclosure.

FIG. 3 illustrates an example flow chart 301 for subscription based directory services for IoT devices consistent with the disclosure. FIG. 3 illustrates a management server 302 to receive, at 330, a packet from a sensor (e.g., the sensor 106) where the packet includes a measurement obtained from the sensor. For example, in advance of transmitting the packet, the sensor may have received a configuration packet (e.g., the configuration packet 116) from an IoT directory service (e.g., the IoT directory service 104) deployed on the management server 302. The configuration packet may instruct the sensor to transmit measurements taken by the sensor to a particular client device (e.g., the client device 108) that had subscribed to the IoT directory service to receive the measurements of the sensor. The packet received by the management server 302 at 330 may include the address of the particular client device. The management server 302, at 332, may identify the address included in the packet.

For example, the management server 302 may determine at 334, using a look up table 305 (e.g., table 1) stored in the IoT directory service, that the client device corresponding to the address is valid. For example, the address included in the packet with the measurement from the sensor may correspond to a client device having a lifetime of 100 minutes. When the management server 302 determines that the address is valid, the client device corresponding to the address is permitted to receive the packet including the measurement taken by the sensor. Thus, at 336, the management server 302 may allow the packet to proceed to the client device corresponding to the address included in the packet. The determination by the management server 302 that the client device subscribed to receive information from the sensor is valid, may prevent packets from being transmitted to a client device that is no longer operable. In other words, the lifetime corresponding to the client devices may keep the look up table 205 updated and prevent wasted resources and lost data. In some examples, packets received from sensors may include addresses to client devices whose lifetimes have expired.

For example, the management server 302 may receive a packet at 330 from a temperature sensor (e.g., the sensor 206-1) where the packet includes a temperature measurement. The management server 302, at 332, may determine the address included in the packet received from the sensor, where the packet includes a topic "temperature" and the temperature measurement obtained by the sensor. In other words, the packet may be a publish message including a text string with the topic "temperature", the temperature measurement, and the address of the client device to which the sensor is to transmit its measurement. At 338, the management server 302 may determine, using the look up table 305 stored in the IoT directory service, that the client device corresponding to the address is expired. For example, an expired client device may be a client device whose lifetime has expired. An expired lifetime may indicate that the client device has been removed from the network, is disabled, is non-functioning, and/or is otherwise no longer subscribed to receive information related to the topic (e.g., "temperature"). In the instance when the management server 302 determines that a client device is expired, the management server 302 may locate a new subscription to the topic included in the packet.

For example, the management server 302 may, at 340, compare the topic included in the packet to the look up table 305 stored in the IoT directory service. In other words, the management server 302 may compare the topic of the packet to the look up table 305 to identify a new client device that may be subscribed to the topic. When the management server 302 identifies the new client device, the management server 302 may, at 344, forward the packet to the new client device corresponding to the topic of the packet. To prevent the sensor from transmitting data to a now expired client device, the management server 302 may, at 346, transmit a new configuration packet including the address of the new client device corresponding to the topic. In other words, the sensor may be directed to transmit its data to a non-expired client device which is subscribed to receive information corresponding to the topic of the sensor.

Subscription based directory services for IoT devices described herein include a management server 302 which may implement a publish-subscribe messaging protocol (e.g., a MQTT protocol) using an IoT directory service. The IoT directory service may deploy a look up table 305 including client device information, the topic to which the client device is subscribed, and a predetermined period of time (e.g., the lifetime) the client device is validated to receive packets about the topic from the sensor. The management server 302 may manage a plurality of IoT devices operating as sensors. The IoT directory service may be accessible to the client devices in the network such that the client devices may subscribe to topic, and when a sensor publishes a message about the topic, the look up table 305 deployed on the IoT directory service may identify which client device is subscribed to that topic. In this way, the management server 302 may dynamically direct low-cost IoT devices to transmit data to corresponding client devices. The inclusion of the lifetime in the look up table 305 may prevent redundancies by removing the address of expired client devices. These examples may reduce the demand to hardcode addresses of the client devices on to IoT devices as changing the address for the IoT device is accomplished by changing the address in the look up table 305.

Figure 4:
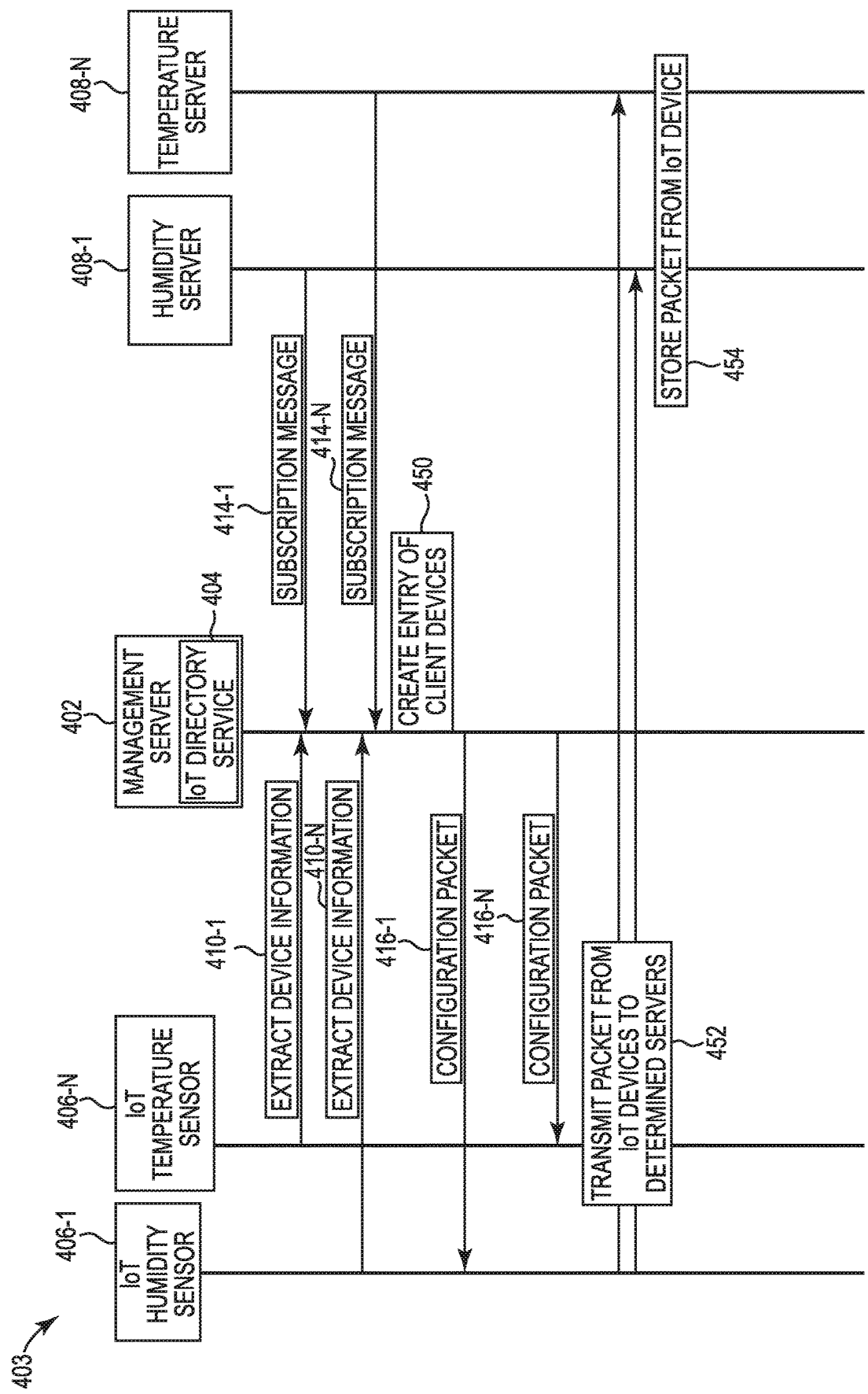
FIG. 4 illustrates an example message flow for subscription based directory services for IoT devices consistent with the disclosure.

FIG. 4 illustrates an example message flow 403 for subscription based directory services for IoT devices consistent with the disclosure. FIG. 4 illustrates an IoT humidity sensor 406-1, an IoT temperature sensor 406-N, a management server 402, an IoT directory service 404, a humidity server 408-1, and a temperature server 408-N. The IoT humidity sensor 406-1 and the IoT temperature sensor 406-N may both be low-cost IoT enabled sensors which may be deployed in a network within a rural environment managed by the management server 402. The management server 402 may be deployed with an IoT directory service 404 which may be accessible to a plurality of client devices such as the humidity server 408-1 and the temperature server 408-N. The management server 402 may utilize a publish-subscribe protocol to dynamically alter a plurality of IoT enabled devices included in the network.

For example, the management server 402 may extract device information 410-1 and 410-N from the IoT humidity sensor 406-1 and the IoT temperature sensor 406-N when they are installed or otherwise switched on in the network managed by the management server 402. Said differently, the IoT humidity sensor 406-1 and the IoT temperature sensor 406-N may generate a publish message including information about the operation of the device (e.g., the topic), geographic location information, etc.). As mentioned, the IoT directory service 404 may be accessible to a plurality of client devices, such as the humidity server 408-1, and the temperature server 408-N.

For example, the humidity server 408-1 may be a server that is collecting data about the humidity levels in a particular environment of the network managed by the management server 402. Likewise, the temperature server 408-N may be a server that is collecting data about the temperature levels in a particular environment of the network managed by the management server 402. The plurality of client devices may transmit a subscription message 414-1 and 414-N containing a topic (e.g., the topic 112-N) to which the client devices would like to subscribe. Specifically, the humidity server 408-1 may transmit the subscription message 414-1 including the topic "humidity". The temperature server 408-N may transmit the subscription message 414-N including the topic "temperature". The topics included in the subscription messages 414-1 and 414-N correspond to data generated from the plurality of IoT devices (e.g., the IoT humidity sensor 406-1, and the IoT temperature sensor 406-N). As mentioned herein, the IoT directory service 404 may include a look up table (e.g., the look up table 205). To enable the management server 402 to dynamically provide IoT directory services to the plurality of IoT devices and the plurality of client devices, entries based on the topic information may be generated in the look up table.

In some examples, a new entry may be generated into the look up table in response to the extraction of device information from a new IoT device. For example, entries may already exist in the look up table for topics such as "humidity" for the IoT humidity sensor 406-1 and "temperature" for the IoT temperature sensor 406-N. However, a new entry may be created for an IoT device with a topic that has not been created (e.g., new topic "sunlight" for an IoT sunlight sensor). In some examples, an entry may be created at 450 in the look up table for the plurality of client devices in response to the management server 402 receiving the subscription messages 414-1 and 414-N. The management server 402 may assign a predetermined period of time (e.g., a lifetime) to the humidity server 408-1 and the temperature server 408-N indicating the amount of time the client devices may be valid to receive information. The management server 402 may search the look up table for the topics received in the device information 410-1 and 410-N to generate configuration packets.

For example, the management server 402 may generate configuration packets 416-1 and 416-N including the topics corresponding to each IoT device, and the address of the corresponding client device that is to receive subsequent data collected by the IoT sensors. Specifically, the management server 402 may utilize the look up table in the IoT directory service 404 to generate a configuration packet 416-1 with the topic "humidity" and the address of the client device, the humidity server 408-1. Likewise, the management server 402 may utilize the look up table in the IoT directory service 404 to generate a configuration packet 416-N with the topic "temperature" and the address of the client device, the temperature server 408-N. This may enable the management server 402 to alter low-cost IoT devices without hardwiring the addresses of specific client devices to the low-cost IoT devices.

For example, at 452, when the IoT humidity sensor 406-1 and the IoT temperature sensor 406-N publish a message (e.g., transmit a packet) including data about their respective topics, the packets may be transmitted to their respective client devices (e.g., the humidity server 408-1, and the temperature server 408-N). In this way, subsequent packets from the IoT humidity sensor 406-1 and the IoT temperature sensor 406-N may be sent to their respective client devices (e.g., the humidity server 408-1, and the temperature server 408-N). At 454, the humidity server 408-1, and the temperature server 408-N may store the packets generated from their respective IoT sensors (e.g., the IoT humidity sensor 406-1, and the IoT temperature sensor 406-N).

Subscription based directory services for IoT devices described herein include a management server 402 which may implement a publish-subscribe messaging protocol (e.g., a MQTT protocol) using an IoT directory service 404. In this way, the management server 402 may dynamically alter where low-cost IoT devices transmit data without utilizing resources such as power, and time, to hardwire each device within a network managed by the management server 402. This may save resources (e.g., battery power) in IoT devices thus demanding less maintenance and/or replacement, which may be useful in rural environments where measurements taken by IoT devices such as the IoT humidity sensor 406-1, and the IoT temperature sensor 406-N are demanded but resources may be sparse. Utilizing a look up table on the IoT directory service 404 may enable the management server 402 to dynamically change where the packets from IoT devices are sent by changing the address associated with topics in the look up table. In other words, as the IoT and client devices change in the network/environment, the management server 402 may dynamically maintain the updated information by altering the look up table.

Figure 5:
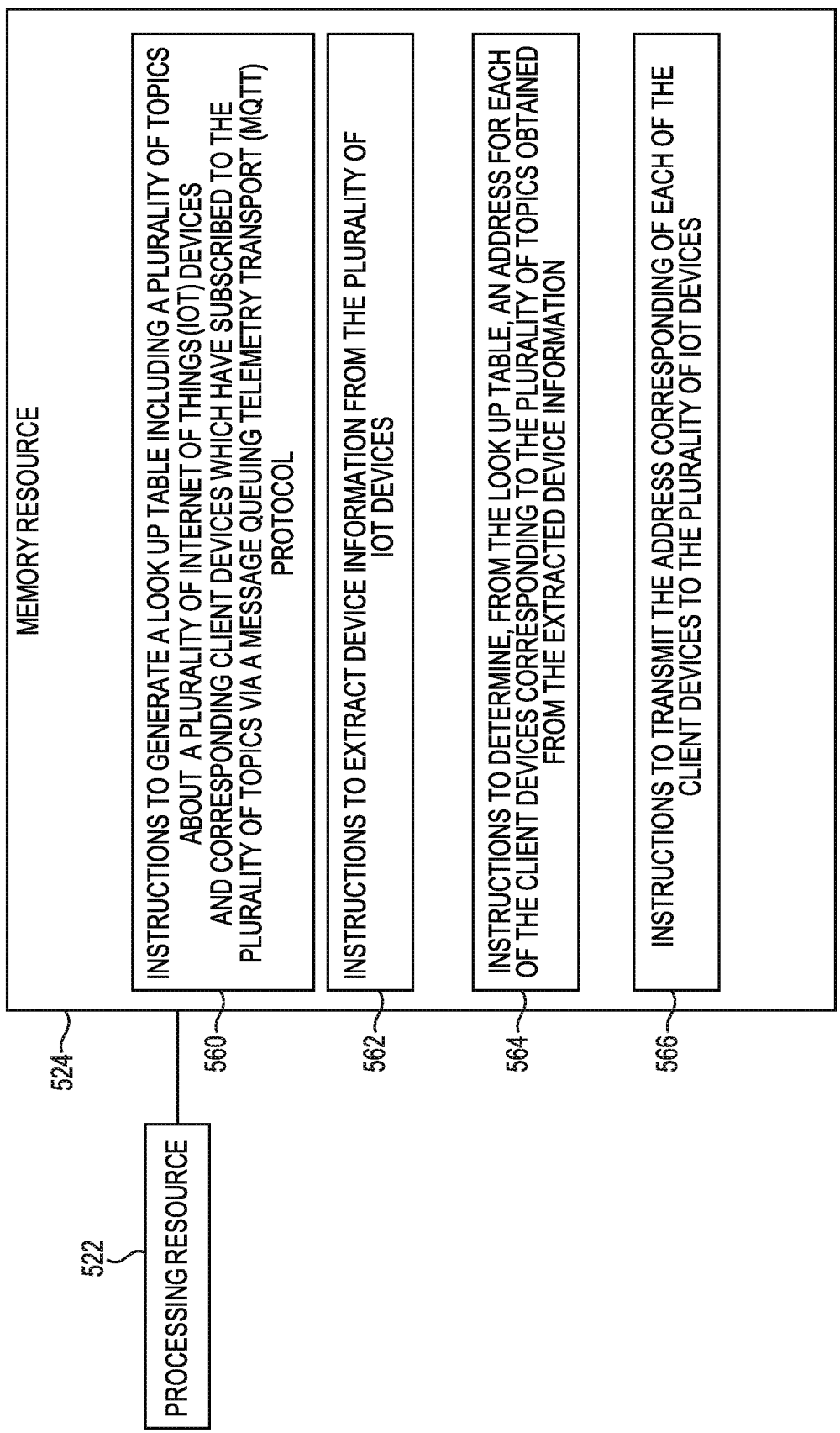
FIG. 5 illustrates an example of a non-transitory machine-readable memory resource and processing resource for subscription based directory services for IoT devices consistent with the disclosure.

FIG. 5 illustrates an example of a non-transitory machine-readable memory resource 524 and processing resource 522 for subscription based directory services for IoT devices consistent with the disclosure. Although not illustrated in FIG. 5 as to not obstruct the examples of the disclosure, the processing resource 522 and the memory resource 524 may be included in a controller (e.g., the controller 220). The processing resource 522 may be a hardware processing unit such as a microprocessor, microcontroller, application specific instruction set processor, coprocessor, network processor, or similar hardware circuitry that may cause machine-readable instructions to be executed. In some examples, the processing resource 522 may be a plurality of hardware processing units that may cause machine-readable instructions to be executed. The processing resource 522 may include central processing units (CPUs) among other types of processing units. The memory resource 524 may be any type of volatile or non-volatile memory or storage, such as random-access memory (RAM), flash memory, read-only memory (ROM), storage volumes, a hard disk, or a combination thereof.

The memory resource 524 may store instructions thereon, such as instructions 560, 562, 564, and 566. When executed by the processing resource 522, the instructions may cause the computing device to perform specific tasks and/or functions. For example, the memory resource 524 may store instructions 560 which may be executed by the processing resource 522 to generate a look up table (e.g., the look up table 205) including a plurality of topics (e.g., the plurality of topics 212) about a plurality of IoT devices and corresponding client devices (e.g., the client devices 208) which have subscribed to the plurality of topics via a MQTT protocol. For example, a management server (e.g., the management server 202) may deploy an IoT directory service (e.g., the IoT directory service 204) with the generated look up table (e.g., the table 1). The look up table may be indexed with the plurality of topics which may correspond to an operation of a plurality of IoT devices (e.g., the plurality of sensors 206).

For example, the memory resource 524 may store instructions 562 which may be executed by the processing resource 522 to extract device information (e.g., the device information 210) from the plurality of IoT devices, wherein the device information includes a topic of the plurality of topics. The plurality of topics may be an index of the look up table. The plurality of IoT devices may transmit a publish message to the management server when the device is added to the network/environment and/or when the IoT device is switched to the on position. The management server may dynamically direct the flow of packets to respective client devices by configuring the plurality of IoT devices.

For example, the memory resource 524 may store instructions 564 which may be executed by the processing resource 522 to determine, from the look up table, an address for each of the client devices corresponding to the plurality of topics obtained from the extracted device information. For example, the address of the client device may correspond to a topic of the IoT device. The address (e.g., the address 118) may be transmitted from the management server to the IoT device in a configuration packet (e.g., the configuration packet 116) generated by the management server.

For example, the memory resource 524 may store instructions 566 which may be executed by the processing resource 522 to transmit the address corresponding of each of the client devices to the plurality of IoT devices, where the client devices and their corresponding IoT devices share a common topic of the plurality of topics. In this way, the management server may dynamically alter the IoT devices in the network by transmitting the addresses of the client devices subscribed to the topics to corresponding IoT devices. Further, as the client devices expire or are otherwise altered, they may re-subscribe, and/or the management server may change the address associated with a topic to redirect the corresponding IoT device. Thus, the management server may avoid hardwiring a plurality of low-cost IoT devices.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

As used herein, the designator "N", particularly with respect to reference numerals in the drawings, indicates that a plurality of the particular feature so designated can be included with examples of the disclosure. The designators can represent the same or different numbers of the particular features. Further, as used herein, "a plurality of" an element and/or feature can refer to more than one of such elements and/or features.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the disclosure. In addition, the proportion and the relative scale of the elements provided in the figures are intended to illustrate the examples of the disclosure and should not be taken in a limiting sense.

What is claimed is:

1. A system, comprising:
a management server to execute a directory service for Internet-of-Things (IoT) devices deployed on the management server, the management server comprising:
one or more processors; and
a memory storing instructions that, when executed by the one or more processors, cause the one or more processors to:
receive a subscription message including a topic about the IoT devices from a client device;
store an address of the client device and the corresponding topic subscribed by the client device in the directory service for the IoT devices;
in response to a sensor being turned on or installed, extract device information from the sensor, wherein the device information includes the topic about the IoT devices; and
transmit a configuration packet to the sensor in response to an identification of the topic from the device information, wherein the configuration packet includes the address of the client device;
determine a validity of the client device corresponding to the address based on a duration for which the address is valid after assignment of the address to the client device;
in response to determining that the client device is valid, continuing a transmission of a generated data packet by the sensor; and
in response to determining that the client device is invalid, terminating the transmission of the generated data packet to the client device.

2. The system of claim 1, wherein the sensor is an IoT device and the topic about the IoT devices is a description of the operation of the IoT device.

3. The system of claim 1, wherein the directory service for the IoT devices disables the subscription message of the client device after the duration.

4. The system of claim 1, wherein the management server stores the address of the client device and the corresponding topic about the IoT devices from the client device by creating an entry in a look up table stored in the directory service for IoT devices.

5. The system of claim 1, wherein the device information includes a geographic location of the sensor.

6. The system of claim 1, wherein the topic about the IoT devices relates to a measurement obtained from the sensor.

7. The system of claim 1, wherein the generated data packet is about the topic.

8. The system of claim 1, wherein the instructions further cause the one or more processors to:
receive the generated data packet from the sensor, wherein the generated data packet includes a measurement obtained by the sensor;
identify the address included in the generated data packet, wherein the validity is based on
a look up table stored in the directory service for the IoT devices.

9. The system of claim 1, wherein the instructions further cause the one or more processors to:
determine the address included in the generated data packet received from the sensor, wherein the generated data packet includes the topic about the IoT devices and a measurement obtained by the sensor;
determine, using a look up table stored in the directory service for the IoT devices, that the client device corresponding to the address is invalid;
compare the topic about the IoT devices included in the packet to the look up table stored in the directory service for the IoT devices;
forward the packet to a new client device corresponding to the topic about the IoT devices of the packet; and
transmit a new configuration packet including the address of the new client device corresponding to the topic about the IoT devices.

10. A management server, comprising:
a controller including a memory resource and a processing resource to execute a directory service for internet-of-things (IoT) devices accessible to a plurality of client devices;
a look up table including a plurality of topics about the IoT devices corresponding to the plurality of client devices, wherein the processing resource comprises:
one or more processors; and
a memory storing instructions that, when executed by the one or more processors, cause the one or more processors to:
receive a subscription message corresponding to a topic about the IoT devices from a client device of the plurality of client devices;
generate an entry in the look up table, the entry including information about the topic about the IoT devices and the client device;
in response to a sensor being turned on or installed, extract device information from the sensor of a plurality of sensors, wherein the device information includes the topic about the IoT devices and a geographic location of the sensor;
determine, from the look up table, an address of the client device corresponding to the topic about the IoT devices from the device information extracted from the sensor; and
transmit a configuration packet including the address of the client device to which the sensor transmits data about the topic about the IoT devices;
determine a validity of the client device corresponding to the address based on a duration for which the address is valid after assignment of the address to the client device;
in response to determining that the client device is valid, continuing a transmission of a generated data packet by the sensor; and
in response to determining that the client device is invalid, terminating the transmission of the generated data packet to the client device.

11. The management server of claim 10, wherein the management server implements a Message Queuing Telemetry Transport (MQTT) protocol.

12. The management server of claim 10, wherein the look up table includes the client device, the topic about the IoT devices to which the client device is subscribed, and the duration for which the address is valid, wherein the duration indicates a period of time the client device is validated to receive packets about the topic about the IoT devices from the sensor.

13. The management server of claim 10, wherein the sensor is a temperature sensor, and the configuration packet alters the temperature sensor to transmit temperature data to the address included in the configuration packet at predetermined intervals for a predetermined period of time.

14. The management server of claim 13, wherein the predetermined period of time corresponds to a period of time of which the client device is validated to receive data about the topic about the IoT devices from the sensor.

15. A non-transitory memory resource including instructions executable by a processing resource to:
- generate a look up table including a plurality of topics about a plurality of Internet-of-things (IoT) devices and corresponding client devices which have subscribed to the plurality of topics via a Message Queuing Telemetry Transport (MQTT) protocol;
- extract device information from second IoT devices that have been turned on or installed, of the plurality of IoT devices, wherein the device information includes a topic of the plurality of topics;
- determine, from the look up table, an address for each of the client devices corresponding to the plurality of topics obtained from the extracted device information; and
- transmit the address corresponding of each of the client devices to the second IoT devices, wherein the client devices and their corresponding second IoT devices share a common topic of the plurality of topics;
- determine a validity of a client device of the client devices corresponding to the address based on a duration for which the address is valid after assignment of the address to the client device;
- in response to determining that the client device is valid, continuing the transmission of a corresponding generated data packet by a second sensor of the second sensors; and
- in response to determining that the client device is invalid, terminating the transmission of the generated data packet to the client device.

16. The memory resource of claim 15, wherein the plurality of topics correspond to data generated from the plurality of IoT devices.

17. The memory resource of claim 15, wherein the plurality of IoT devices comprise a plurality of sensors configured to collect data about temperature, humidity, precipitation, ultraviolet radiation, atmospheric content concentration, sound, pressure, movement, or a combination thereof.

18. The memory device of claim 15, wherein the device information includes a geographic location and the topic is an indicator of what data the IoT device is designed to generate.

19. The memory device of claim 15, wherein a new entry is generated into the look up table in response to the extraction of device information from a new IoT device.

* * * * *